US012665337B2

(12) United States Patent
Chen et al.

(10) Patent No.: US 12,665,337 B2
(45) Date of Patent: Jun. 23, 2026

(54) CONNECTOR AND ELECTRONIC DEVICE

(71) Applicant: HUAWEI TECHNOLOGIES CO., LTD., Shenzhen (CN)

(72) Inventors: Zongxun Chen, Dongguan (CN); Zhong Yan, Dongguan (CN); Peng Xiao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 161 days.

(21) Appl. No.: 18/359,246

(22) Filed: Jul. 26, 2023

(65) Prior Publication Data

US 2023/0369796 A1 Nov. 16, 2023

Related U.S. Application Data

(63) Continuation of application No. PCT/CN2022/075811, filed on Feb. 10, 2022.

(30) Foreign Application Priority Data

Jan. 27, 2021 (CN) ......................... 202110109129.6

(51) Int. Cl.
*H01R 13/40* (2006.01)
*H01R 13/02* (2006.01)
*H01R 13/629* (2006.01)

(52) U.S. Cl.
CPC ............. *H01R 13/40* (2013.01); *H01R 13/02* (2013.01); *H01R 13/629* (2013.01)

(58) Field of Classification Search
CPC ....... H01R 13/40; H01R 13/02; H01R 13/629
USPC .................................................... 439/296, 66
See application file for complete search history.

(56) References Cited

U.S. PATENT DOCUMENTS 6,521,842 B2 2/2003 Brinthaupt, III et al.
7,438,578 B1 * 10/2008 Nin ........................ H01R 12/89 439/260

FOREIGN PATENT DOCUMENTS

CN 2687871 Y 3/2005
CN 1901287 A 1/2007
CN 201594598 U 9/2010
CN 101924284 A 12/2010
CN 103872501 A 6/2014
CN 104218391 A 12/2014
CN 111048924 A 4/2020
CN 211208719 U 8/2020
(Continued)

*Primary Examiner* — Gary F Paumen
(74) *Attorney, Agent, or Firm* — WOMBLE BOND DICKINSON (US) LLP

(57) ABSTRACT

The present disclosure provides a connector that includes a substrate and M conductive terminals, where the substrate is provided with M through holes, and the M conductive terminals are disposed to penetrate through the M through holes in a one-to-one correspondence. The conductive terminal includes a first conductive part, a second conductive part, and a holding part. The first conductive part is located at one end of the conductive terminal, the second conductive part is located at the other end of the conductive terminal, and the holding part is located between the first conductive part and the second conductive part. The conductive terminal may be fastened to the substrate by using the fastening medium, so that disposing of a stub structure may be avoided, to improve signal transmission performance of the conductive terminal.

14 Claims, 9 Drawing Sheets

(56) References Cited

FOREIGN PATENT DOCUMENTS

| | | | |
|---|---|---|---|
| EP | 0805521 | A1 | 11/1997 |
| EP | 1605552 | A1 | 12/2005 |
| JP | 2016540362 | A | 12/2016 |
| TW | M331237 | U | 4/2008 |

* cited by examiner

CONNECTOR AND ELECTRONIC DEVICE

CROSS-REFERENCE TO RELATED APPLICATIONS

This application is a continuation of International Application No. PCT/CN2022/075811, filed on Feb. 10, 2022, which claims priority to Chinese Patent Application No. 202110109129.6, filed on Jan. 27, 2021. The disclosures of the aforementioned applications are hereby incorporated by reference in their entireties.

TECHNICAL FIELD

This application relates to the field of electronic device technologies, and in particular, to a connector and an electronic device.

BACKGROUND

In electronic devices, electrical elements (such as chips and main boards) may be connected by using connectors, to implement functions such as electrical signal transmission between the electrical elements. For example, in a computer, various electrical elements such as main boards and chips are usually included. The chip may be installed on the main board by using the connector, and an electrical connection between the chip and the main board is implemented. However, a current connector has a defect in structure design. As a result, an electrical signal is attenuated significantly when passing through the connector, which is not conducive to improving signal transmission performance.

SUMMARY

This application provides a connector that is conducive to improving signal transmission performance and an electronic device.

According to an embodiment, this application provides a connector. The connector includes a substrate and M conductive terminals. The substrate is provided with M through holes, the M conductive terminals are disposed to penetrate through the M through holes in a one-to-one correspondence, and the conductive terminal includes a first conductive part, a second conductive part, and a holding part. The first conductive part is located at one end of the conductive terminal, the second conductive part is located at the other end of the conductive terminal, and the holding part is located between the first conductive part and the second conductive part. The holding part is fastened in the through hole by using a fastening medium. M is an integer greater than or equal to 1. In some embodiments, the M conductive terminals are disposed in a one-to-one correspondence with the M through holes. One conductive terminal is disposed to penetrate through each through hole, and each conductive terminal is fastened to the substrate by using the fastening medium that is located in the through hole. According to the connector provided in this application, the conductive terminal may be fastened to the substrate by using the fastening medium, so that disposing of a stub structure may be avoided, to facilitate improving signal transmission performance of the conductive terminal.

In some embodiments, structure types of the first conductive part and the second conductive part may be various.

For example, the first conductive part may be of an elastic arm structure or a solder ball structure. The second conductive part may be of an elastic arm structure or a solder ball structure. Structure types of the first conductive part and the second conductive part may be the same or different.

In another example, the conductive terminal may alternatively include a first segment and a second segment that are separated from each other. For example, the first conductive part and a part of the holding part may be located in the first segment, and the second conductive part and another part of the holding part may be located in the second segment. In other words, installation convenience of the conductive terminal can be improved by disposing a separation structure. For example, when the conductive terminal penetrates through the through hole, interference may occur between the first conductive part or the second conductive part and the through hole, which may reduce assembly convenience between the conductive terminal and the substrate. Therefore, the first conductive part and the second conductive part can be prevented from penetrating through the through hole after the conductive terminal is separated into the first segment and the second segment. In this way, the interference between the first conductive part and the second conductive part, and the through hole can be avoided.

In addition, in an assembly process of the connector, to maintain relative locations of the conductive terminal and the substrate, the connector may further include a support base. A support part that is configured to be fastened to the support base may be disposed in the conductive terminal. The support base may be first fastened to the support part of the conductive terminal before the conductive terminal is installed on the substrate. Then, the conductive terminal with the support base may be placed on an upper plate surface of the substrate, so that the support base abuts against one of plate surfaces (for example, the upper plate surface) of the substrate, and the holding part extends into the through hole. In other words, the conductive terminal may be stably placed on the substrate by using the support base, and therefore, correct relative locations of the conductive terminal and the substrate are maintained.

In addition, when the connector is disposed between a chip and a main board, under an effect of an extrusion force, the first conductive part or the second conductive part may be broken or generate another bad condition due to excessive deformation. The first conductive part is used as an example. After the support base is disposed, one side of the support base may abut against the plate surface of the substrate, and another side of the support base may abut against a lower surface of the chip, so that a minimum distance between the chip and the substrate can be limited, to avoid overpressure on the first conductive part.

Alternatively, a protrusion part may alternatively be disposed on the support base. The protrusion part can effectively increase a height of the support base without significantly increasing weight of the support base, which is conducive to avoiding overpressure on the first conductive part.

During disposing, the protrusion part may extend in a direction away from the substrate, so that the top of the protrusion part can abut against the chip, to increase a minimum distance between the chip and the substrate. In other words, the protrusion part can increase the height of the support base while not significantly increasing the weight of the support base, which is conducive to implementing lightweight design of the connector.

In addition, to implement an electrical connection between some conductive terminals, a conductive layer may further be disposed in the through hole. In addition, a conductive circuit may further be disposed on the substrate, and the conductive circuit may be electrically connected to a conductive layer that needs to be electrically connected. In some embodiments, the conductive terminal may be electrically connected to a conductive layer in a corresponding through hole by using the fastening medium, and conductive layers in different through holes may be connected by using the conductive circuit, so that electrical connections between a plurality of conductive terminals are implemented.

The fastening medium may be a conductor material such as tin or silver, which facilitates implementing an efficient electrical connection between the conductive terminal and the conductive layer.

The conductive circuit may be disposed on one of the plate surfaces of the substrate, or on both the plate surfaces of the substrate.

Alternatively, the substrate may be of a stacked structure of a plurality of sub-substrates. When the conductive circuit is disposed, the conductive circuit may alternatively be disposed between two adjacent (or stacked) sub-substrates.

According to another embodiment, this application further provides an electronic device. The electronic device includes a first electrical element, a second electrical element, and a connector. The first electrical element includes a pad, and the second electrical element also includes a pad on the top. The pad of the first electrical element may be connected to a first conductive part of a conductive terminal. The pad of the second electrical element may be connected to a second conductive part of the conductive terminal. In other words, the conductive terminal can implement an electrical connection between the first electrical element and the second electrical element.

In an embodiment, the first electrical element may be an electrical element such as a chip, and the second electrical element may be an electrical element such as a main board. Types of the first electrical element and the second electrical element are not limited in this application. In addition, the electronic device may be a type such as a mobile phone, a tablet computer, a desktop computer, or a television. In other words, the connector may be applied to a plurality of different types of electronic devices, to implement an electrical connection between electrical elements that need to be connected.

DESCRIPTION OF EMBODIMENTS

To make the objectives, technical solutions, and advantages of this application clearer, the following further describes this application in detail with reference to the accompanying drawings.

For ease of understanding a connector provided in embodiments of this application, the following first describes an application scenario of the connector.

Figure 1:
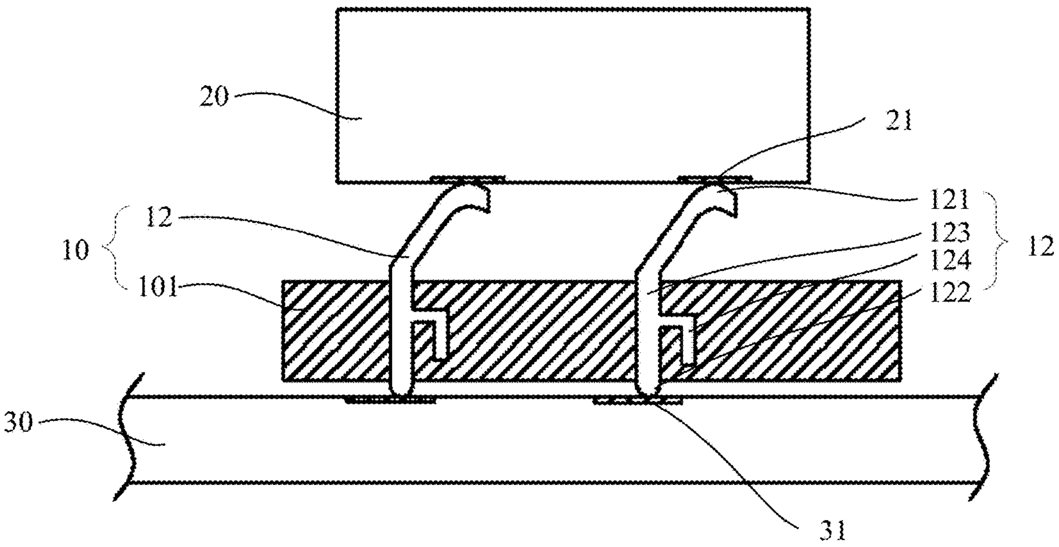
FIG. 1 is a schematic diagram of a cross-sectional structure of an electronic device according to an embodiment of this application.

As shown in FIG. 1, in an embodiment provided in this application, a chip 20 may be connected to a main board 30 by using a connector 10 (which may also be understood as a chip socket). The connector 10 may implement a signal connection between the chip 20 and the main board 30, and a power supply circuit on the main board 30 may also supply power to the chip 20 by using the connector 10.

As shown in FIG. 1, the connector 10 may include a housing 101 and a conductive terminal 12 (two conductive terminals are shown in the figure). The conductive terminal 12 may be made of a material with good conductivity, such as copper, aluminum, silver, or an alloy of the copper, the aluminum, and the silver. The housing 101 may be made of a material with good insulation properties, such as plastic, nylon, or liquid crystal polymer. The conductive terminal 12 is fastened on the housing 101, and is configured to maintain a location of the conductive terminal 12, to facilitate implementing a good connection between the chip 20 and the main board 30. In terms of functions, the conductive terminal 12 usually includes four parts: a first conductive part 121, a second conductive part 122, a holding part 123, and a stub structure (stub) 124. The first conductive part 121 is configured to be electrically connected to a pad 21 (or another conductive structure) of the chip 20, and the second conductive part 122 is configured to be electrically connected to a pad 31 (or another conductive structure) that is on the main board 30. The holding part 123 and the stub structure 124 are configured to be fastened to the housing 101. Currently, the conductive terminal 12 is fastened to the housing 101 through physical interference between the holding part 123 and the stub structure 124.

In some embodiments, as shown in FIG. 1, the stub structure 124 is a part that extends outwards from one side of the holding part 123. The conductive terminal 12 may be fastened to the housing 101 by using the stub structure 124 and the holding part 123. However, in an embodiment, the stub structure 124 may significantly reduce signal transmission performance of the conductive terminal 12. The signal transmission performance of the conductive terminal 12 at least includes parameters such as a resonance frequency and a bandwidth.

Figure 2:
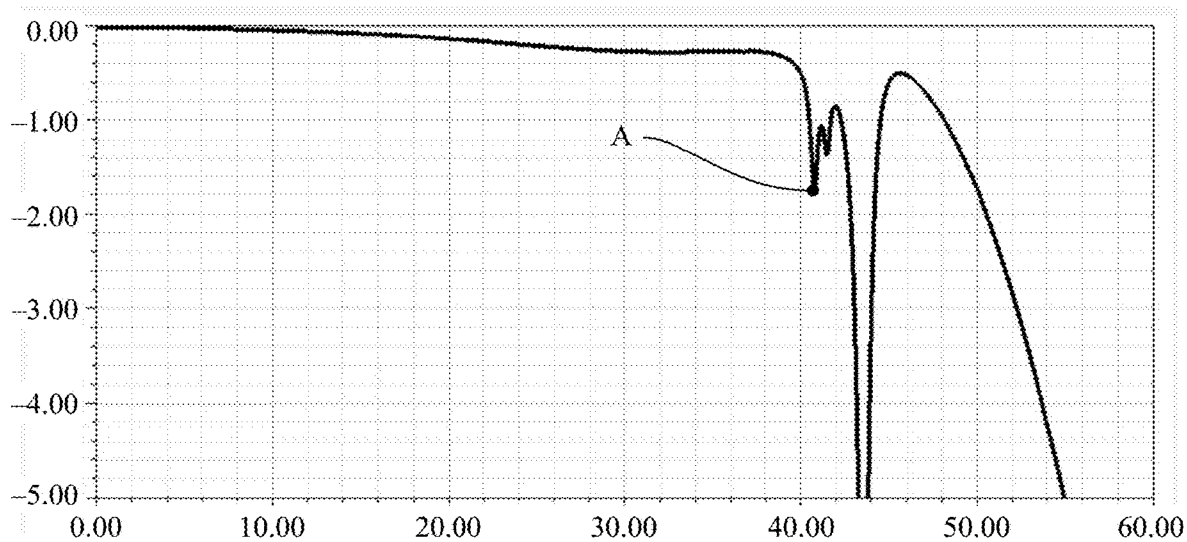
FIG. 2 is a diagram of signal data simulation of a connector according to an embodiment of this application.

As shown in FIG. 2, FIG. 2 shows a diagram of signal data simulation of a conductive terminal 12 with a stub structure 124.

Figure 3:
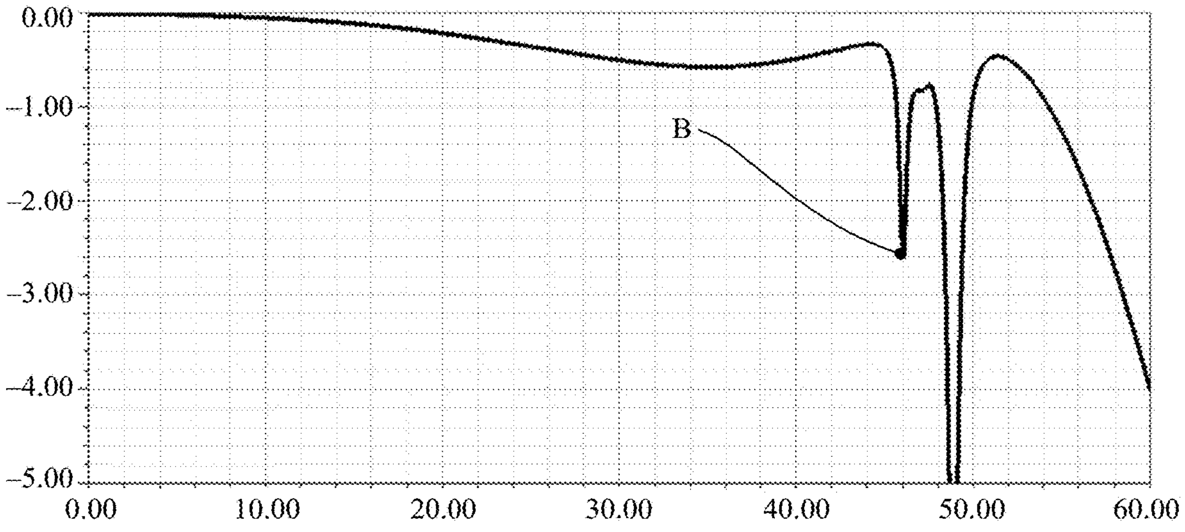
FIG. 3 is a diagram of signal data simulation of another connector according to an embodiment of this application.

FIG. 3 shows a diagram of signal data simulation of a conductive terminal 12 without a stub structure 124.

In FIG. 2 and FIG. 3, a horizontal coordinate is a resonance frequency with a unit GHz (Gigahertz); and a vertical coordinate is an insertion loss.

It can be learned by comparing FIG. 2 and FIG. 3 that, when the stub structure 124 exists, resonance of the conductive terminal 12 occurs near a point A. A resonance frequency of the point A is about 41 GHz. When the stub structure 124 does not exist, resonance of the conductive terminal 12 occurs near a point B. A resonance frequency of the point B is about 46 GHz. It can be learned that, when the conductive terminal 12 includes the stub structure 124, a resonance frequency of the conductive terminal 12 may be significantly reduced, which is not conducive to increasing a bandwidth of a transmission signal of the conductive terminal 12.

Therefore, embodiments of this application provide a connector that can effectively avoid disposing a stub structure to improve signal transmission performance.

To make objectives, technical solutions, and advantages of this application clearer, the following further describes this application in detail with reference to the accompanying drawings and embodiments.

Terms used in the following embodiments are only intended to describe embodiments, but are not intended to limit this application. Terms "one", "a", and "the" of singular forms used in this specification and the appended claims of this application are also intended to include plural forms like "one or more", unless otherwise specified in the context clearly. It should be further understood that in the following embodiments of this application, "at least one" refers to one, two, or more.

Reference to "an embodiment", or the like described in this specification indicates that one or more embodiments of this application include a feature, structure, or characteristic described with reference to the embodiments. Therefore, statements such as "in an embodiment", "in some implementations", "in other implementations", and the like that appear at different places in this specification do not necessarily refer to a same embodiment. Instead, the statements mean "one or more but not all of embodiments", unless otherwise emphasized in another manner. The terms "include/comprise", and "have", and variants thereof all mean "include but are not limited to", unless otherwise emphasized in another manner.

Figure 4:
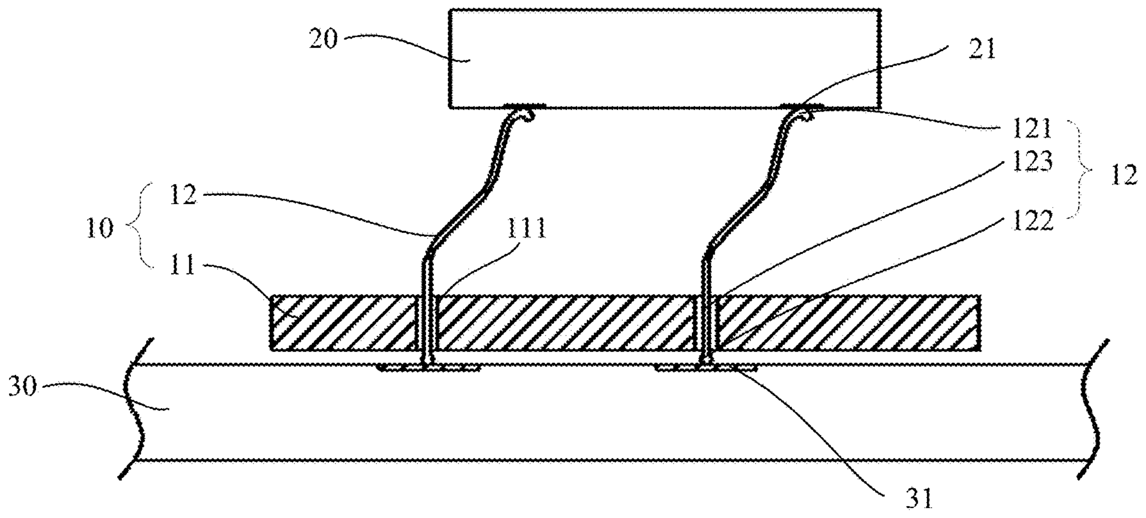
FIG. 4 is a schematic diagram of a cross-sectional structure of another electronic device according to an embodiment of this application.

As shown in FIG. 4, in an embodiment provided in this application, a connector 10 includes a substrate 11 and a conductive terminal 12. The substrate 11 is provided with a through hole 111 that communicates with an upper plate surface and a lower plate surface that are of the substrate 11. The conductive terminal 12 is disposed to penetrate through the through hole 111, and a part of the conductive terminal 12 is fastened to an inner wall of the through hole 111 by using a fastening medium (not shown in the figure). In some embodiments, the conductive terminal 12 includes a first conductive part 121, a second conductive part 122, and a holding part 123. The first conductive part 121 is located at one end (an upper end in the figure) of the conductive terminal 12, the second conductive part 122 is located at the other end (a lower end in the figure) of the conductive terminal 12, and the holding part 123 is located between the first conductive part 121 and the second conductive part 122. The first conductive part 121 extends out of an upper end of the through hole 111 (or the upper plate surface of the substrate 11), and is configured to be connected to a pad 21 of a chip 20. The second conductive part 122 extends out of a lower end of the through hole 111 (or the lower plate surface of the substrate 11), and is configured to be connected to a pad 31 of a main board 30. In other words, the chip 20 may be electrically connected to the main board 30 by using the conductive terminal 12, to implement functions such as transmission of an electrical signal. The holding part 123 may be fastened to the inner wall of the through hole 111 by using the fastening medium, so that disposing of a stub structure can be avoided, to facilitate improving signal transmission performance of the conductive terminal 12.

During disposing, structures of the first conductive part 121 and the second conductive part 122 may be various.

Figure 5:
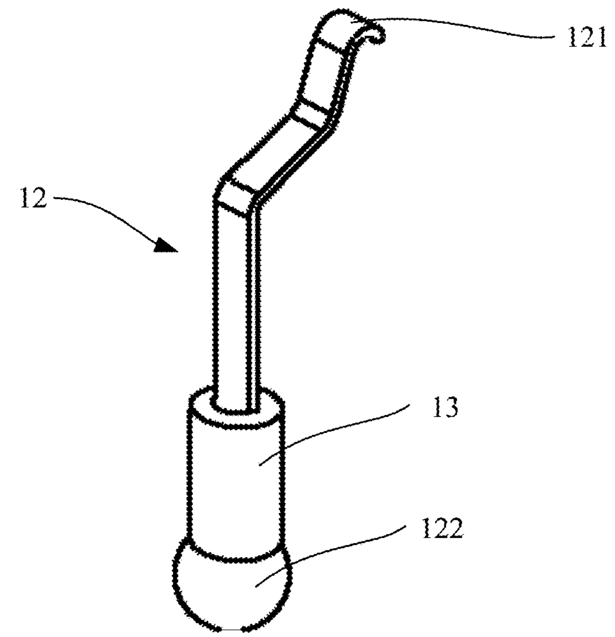
FIG. 5 is a schematic diagram of a partial structure of a connector according to an embodiment of this application.

For example, as shown in FIG. 4 and FIG. 5, in an embodiment provided in this application, the first conductive part 121 is of an elastic arm structure, and the second conductive part 122 is of a solder ball structure. In some embodiments, in an actual application, the conductive terminal 12 may be compressed and fastened between the chip 20 and the main board 30. The first conductive part 121 may elastically abut against the pad 21 through elastic deformation of the first conductive part 121, to improve a connection effect between the first conductive part 121 and the pad 21. In addition, under an effect of a compression force, the second conductive part 122 may also well abut against the pad 31, to improve a connection effect between the second conductive part 122 and the pad 31.

During manufacturing, a process such as cutting or bending may be used to form an elastic arm structure (the first conductive part 121) in the conductive terminal 12. The conductive terminal 12 may be made of a material with good conductivity, such as copper, aluminum, silver, or an alloy of the copper, the aluminum, and the silver. The material of the conductive terminal 12 is not limited in this application.

For the second conductive part 122, in an embodiment, a solder ball may be implanted at a lower end of the conductive terminal 12 by using a welding process, to fasten the solder ball to the lower end of the conductive terminal 12.

When the connector 10 is assembled, the conductive terminal 12 may be inserted into the through hole 111 from an upper side of the substrate 11. Then the fastening medium 13 is injected into the through hole 111 through a process such as reflow soldering or sintering, so that the holding part 123 is fastened to the inner wall of the through hole 111. Finally, the solder ball may be implanted at the lower end of the conductive terminal 12, and the solder ball is stably fastened at the lower end of the conductive terminal 12 through secondary reflow soldering, to form the second conductive part 122.

In an embodiment, the second conductive part 122 may be electrically connected to the pad 31 in a manner of abutting or welding. In some embodiments, the solder ball may directly abut against the pad 31, to implement an electrical connection between the conductive terminal 12 and the pad 31. Alternatively, the solder ball may be welded to the pad 31 through a process such as reflow soldering, to improve a connection effect between the conductive terminal 12 and the pad 31. In embodiment, the solder ball structure may be a conductive spherical structure such as a tin ball or a silver ball, or another shape of structure. A material of the solder ball structure is not limited in this application.

In some embodiments, both the first conductive part 121 and the second conductive part 122 may be of the solder ball structure. Alternatively, the second conductive part 122 is of the solder ball structure and the second conductive part 122 is of the elastic arm structure. Alternatively, both the first conductive part 121 and the second conductive part 122 may be of the elastic arm structure.

Figure 6:
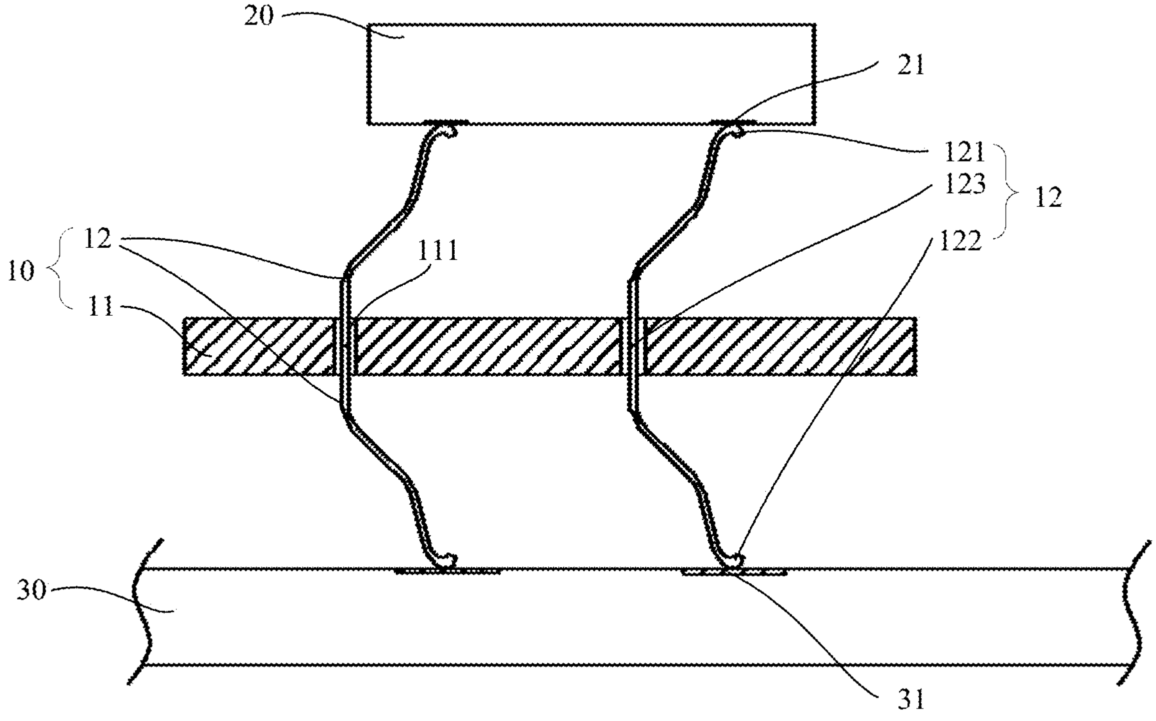
FIG. 6 is a schematic diagram of a cross-sectional structure of another electronic device according to an embodiment of this application.

For example, as shown in FIG. 6, in an embodiment provided in this application, both the first conductive part 121 and the second conductive part 122 are of the elastic arm structure. In an embodiment, the first conductive part 121 may elastically abut against the pad 21 of the chip 20, to ensure a connection effect between the conductive terminal 12 and the pad 21. Correspondingly, the second conductive part 122 may also elastically abut against the pad 31 of the main board 30, to ensure a connection effect between the conductive terminal 12 and the pad 31. A shape structure of the elastic arm structure is not limited in this application. In addition, a structure shape of the first conductive part 121 may be the same as or different from a structure shape of the second conductive part 122. In an embodiment, when the elastic arm structure abuts against the pad structure of the chip 20 or the main board 30, elastic deformation can be generated, and the elastic arm structure abuts against the pad structure well.

In addition, to facilitate installing the conductive terminal 12 on the substrate 11, in some embodiments, the conductive terminal 12 may further include two separated parts.

Figure 7:
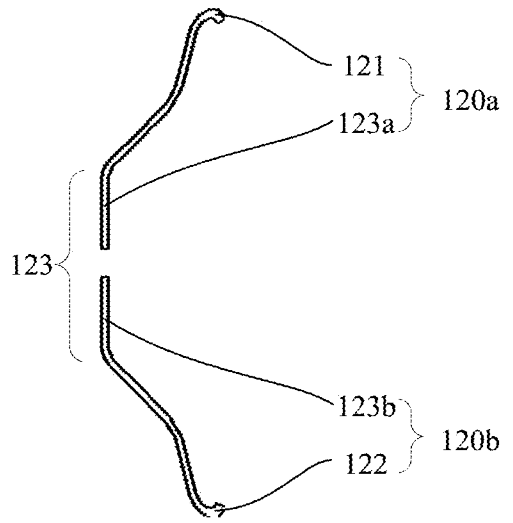
FIG. 7 is a schematic diagram of a structure of a conductive terminal according to an embodiment of this application.

For example, as shown in FIG. 7, in an embodiment provided in this application, the conductive terminal 12 includes a first segment 120*a* (an upper part in the figure) and a second segment 120*b* (a lower part in the figure). The first conductive part 121 and a part 123*a* (an upper part) of the holding part 123 are located in the first segment 120*a*. The second conductive part 122 and another part 123*b* (a lower part) of the holding part 123 are located in the second segment 120*b*.

Refer to FIG. 6 and FIG. 7 together. During assembly, the first segment 120*a* may be inserted into the through hole 111 from an upper side of the substrate 11, and the part 123*a* (the upper part) of the holding part 123 is fastened in the through hole 111 by using the fastening medium 13. The second segment 120*b* may be inserted into the through hole 111 from a lower side of the substrate 11, and the another part 123*b* (the lower part) of the holding part 123 is fastened in the through hole 111 by using the fastening medium 13. During assembly, the first segment 120*a* may be first assembled with the substrate 11, and then the second segment 120*b* is assembled with the substrate 11. Alternatively, the second segment 120*b* may be first assembled with the substrate 11, and then the first segment 120*a* is assembled with the substrate 11. Alternatively, the first segment 120*a*, the second segment 120*b* may be assembled with the substrate 11 at the same time.

In addition, in an assembly process of the connector 10, to maintain relative locations of the conductive terminal 12 and the substrate 11, the connector 10 may further include a support base.

Figure 8:
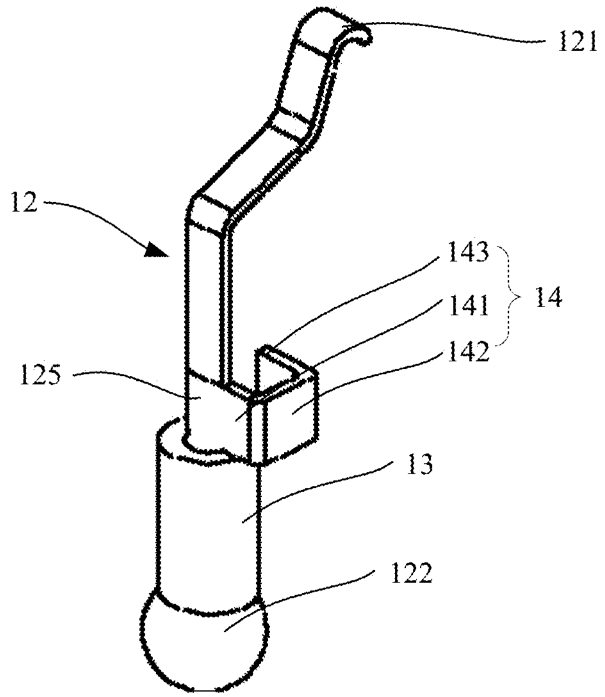
FIG. 8 is a schematic diagram of a partial structure of a connector according to an embodiment of this application.
Figure 9:
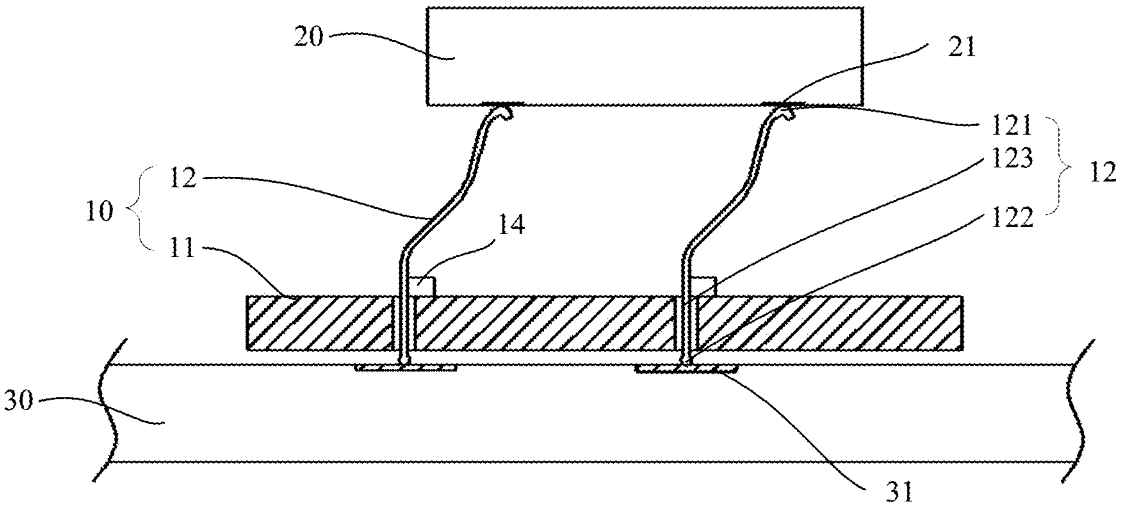
FIG. 9 is a schematic diagram of a cross-sectional structure of another electronic device according to an embodiment of this application.

As shown in FIG. 8 and FIG. 9, a support part 125 that is configured to be fastened to the support base 14 may be disposed in the conductive terminal 12. The support base 14 may be first fastened to the support part 125 of the conductive terminal 12 before the conductive terminal 12 is installed on the substrate 11. Then, the conductive terminal 12 with the support base 14 may be placed on the upper plate surface of the substrate 11, and the holding part 123 extends into the through hole 111. In other words, the conductive terminal 12 may be stably placed on the substrate 11 by using the support base 14, and therefore, correct relative locations of the conductive terminal 12 and the substrate 11 are maintained.

The support base 14 may be a structural member that is made of a material with good insulation properties, such as plastic, nylon, or liquid crystal polymer. During manufacturing, the support base 14 may be manufactured in a manner such as injection molding, and then is fastened to the conductive terminal 12 in a manner such as bonding. Alternatively, the support base 14 may be directly molded on the support part of the conductive terminal 12 by using a process such as in-mold injection molding, and combination between the support base 14 and the conductive terminal 12 is implemented. A molding manner of the support base 14 and a connection manner between the support base 14 and the conductive terminal 12 are not limited in this application.

In addition, in an embodiment, shapes of the support base 14 may also be various.

For example, as shown in FIG. 8, in an embodiment provided in this application, the support base 14 is of a U-shaped structure. In some embodiments, the support base 14 includes a first plate body 141, a second plate body 142, and a third plate body 143. The first plate body 141 and the third plate body 143 are disposed opposite to each other. The second plate body 142 is located between the first plate body 141 and the third plate body 143 and is configured to implement that the first plate body 141 is fastened to the third plate body 143. The first plate body 141 of the support base 14 is connected to the conductive terminal 12. The support base 14 may stably support the conductive terminal 12 on the substrate 11 by using the U-shaped structure, to avoid shaking generated between the conductive terminal 12 and the substrate 11. In addition, the weight of the support base 14 can be effectively reduced by using the U-shaped structure, which facilitates implementing lightweight design of the connector.

In addition, in an embodiment, the support base 14 can further play a support role, to avoid a bad condition such as damage due to overpressure on the conductive terminal 12.

In some embodiments, as shown in FIG. 9, when the connector 10 is disposed between the chip 20 and the main board 30, under an effect of an extrusion force, the first conductive part 121 (an elastic arm structure) may be broken or generate another bad condition due to excessive deformation. After the support base 14 is disposed, a lower surface of the support base 14 may abut against the upper plate surface of the substrate 11, and an upper surface of the support base 14 may abut against a lower surface of the chip 20, so that a minimum distance between the chip 20 and the substrate 11 can be limited, to avoid a condition of overpressure on the first conductive part 121.

In some embodiments, a height of the support base 14 may be properly set according to an actual requirement.

Figure 10:
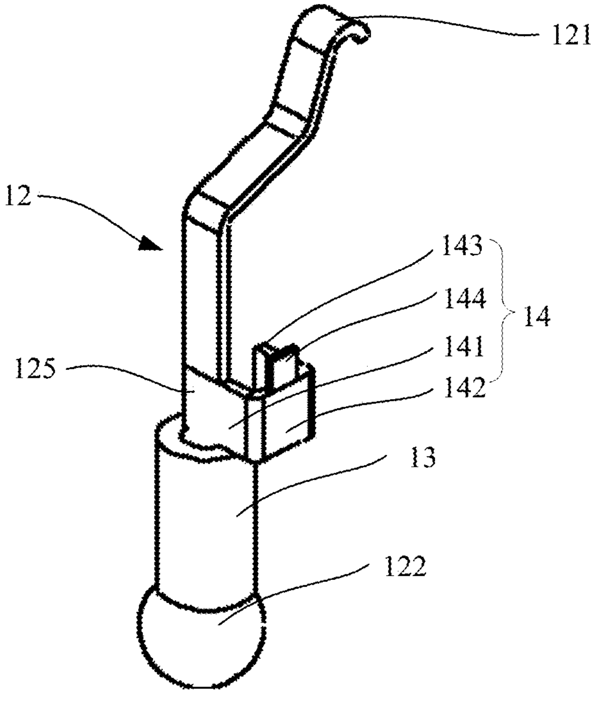
FIG. 10 is a schematic diagram of a partial structure of another connector according to an embodiment of this application.
Figure 11:
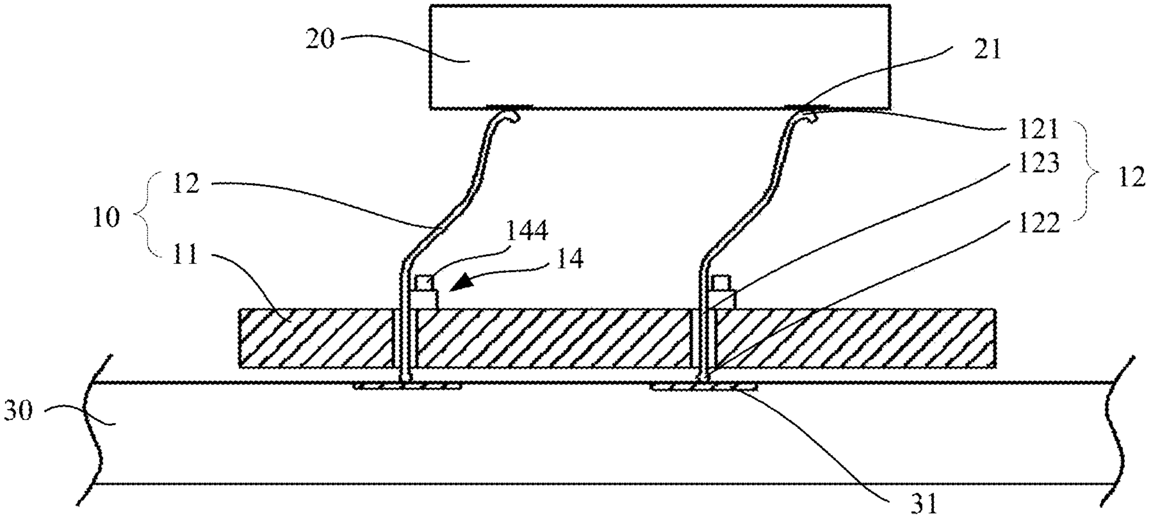
FIG. 11 is a schematic diagram of a cross-sectional structure of another electronic device according to an embodiment of this application.

Alternatively, as shown in FIG. 10 and FIG. 11, a protrusion part 144 may alternatively be disposed on the upper surface of the support base 14. The protrusion part 144 can effectively increase the height of the support base 14 without significantly increasing the weight of the support base 14, which is conducive to avoiding overpressure on the first conductive part 121.

During disposing, the protrusion part 144 may extend in a direction (an upward direction in the figure) away from the substrate 11, so that the lower surface of the chip 20 can abut against an upper surface of the protrusion part 144. Alternatively, the protrusion part 144 may alternatively extend towards a direction of the substrate 11, so that the upper plate surface of the substrate 11 can abut against the protrusion part 144. In other words, the protrusion part 144 can increase the height of the support base 14, to increase the minimum distance between the chip 20 and the substrate 11.

It may be understood that, when a second conductive part 122 is of the elastic arm structure, the support base 14 may also be disposed on the lower side of the substrate 11, to ensure a minimum distance between the lower plate surface of the substrate 11 and the main board 30.

In addition, to improve manufacturing convenience of the connector 10 and simplify an assembly process, one support base 14 may also be connected to a plurality of conductive terminals 12 at the same time.

Figure 12:
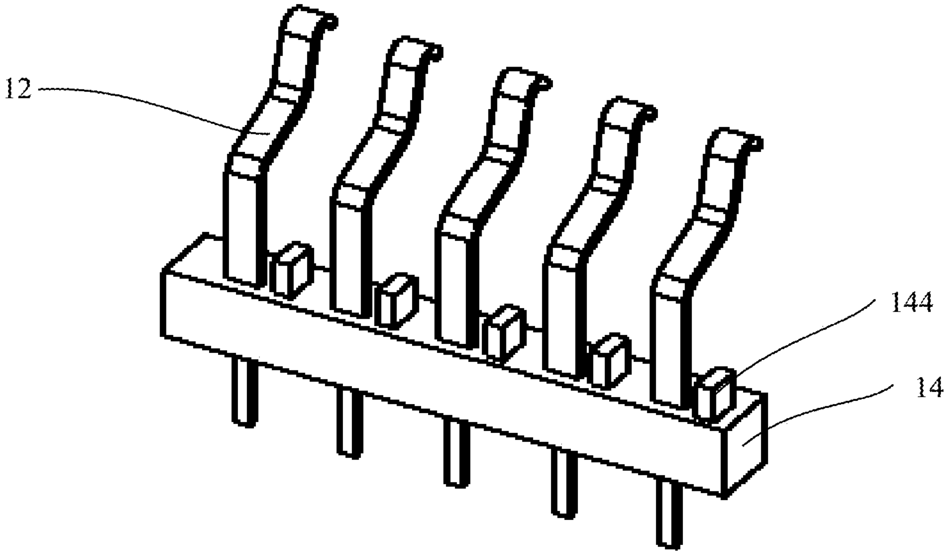
FIG. 12 is a schematic diagram of a partial structure of another connector according to an embodiment of this application.

For example, as shown in FIG. 12, in an embodiment provided in this application, the support base 14 is of a long strip structure, and a plurality of conductive terminals 12 (five conductive terminals are shown in the figure) disposed in a row are fastened to the support base 14. In other words, the plurality of conductive terminals 12 may be fastened at positions by using a single support base 14, so that convenience during manufacturing and assembly can be effectively improved.

In summary, the support base 14 may be fastened to only one conductive terminal 12, or to more than one conductive terminal 12 at the same time.

In addition, in an embodiment, a disposing quantity of conductive terminals 12 and a location arrangement of the plurality of conductive terminals 12 may also be correspondingly adjusted according to an actual requirement.

In summary, there may be M conductive terminals 12. Correspondingly, M through holes 111 may be disposed in the substrate 11, and the M conductive terminals 12 are disposed in a one-to-one correspondence with the M through holes 111. Alternatively, it may be understood that each conductive terminal 12 is fastened to a corresponding through hole 111. A disposing location of the through hole 111 on the substrate 11 may be flexibly disposed according to an actual requirement. In addition, a shape and a size of a cross section of the through hole 111 may also be flexibly selected and adjusted according to an actual requirement, which is not limited in this application.

In addition, in an embodiment, some conductive terminals 12 are configured to implement an electrical connection between the chip 20 and the main board 30. Some conductive terminals 12 further need to be grounded. For ease of understanding this technical solution, the conductive terminal 12 configured to implement the electrical connection between the chip 20 and the main board 30 may be referred to as a signal terminal. The conductive terminal 12 configured to be grounded is referred to as a ground terminal.

In a current connector 10, ground terminals are separately grounded, and an entire ground network is not formed. Therefore, signal transmission performance of the connector 10 is also reduced.

Figure 13:
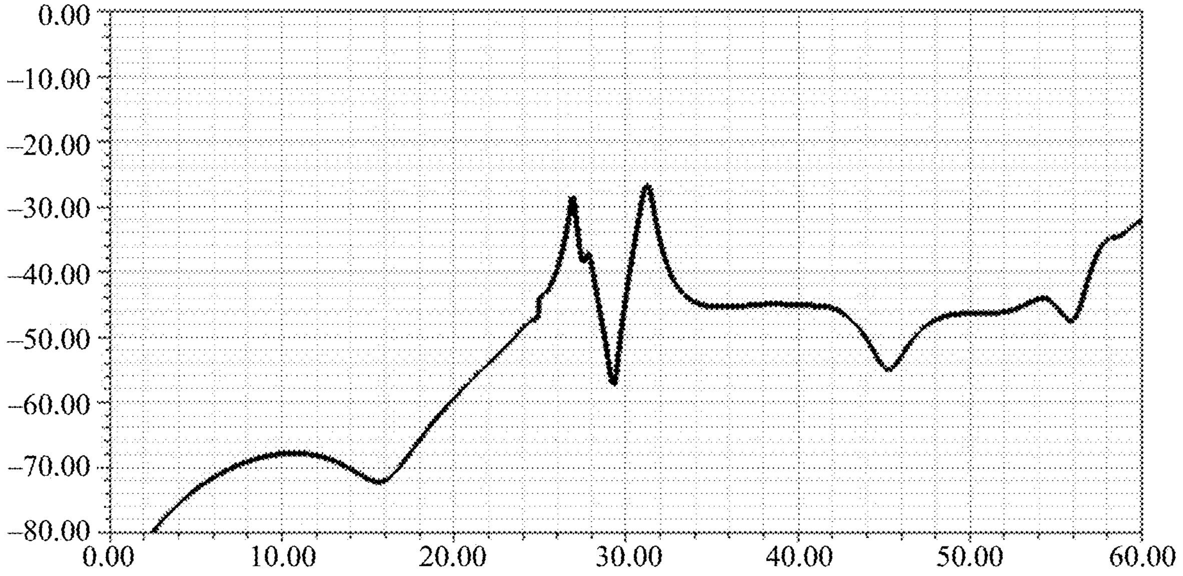
FIG. 13 is a diagram of signal data simulation of a connector according to an embodiment of this application.

For example, FIG. 13 shows a diagram of signal data simulation of the connector 10 obtained when a plurality of ground terminals are separately grounded.

Figure 14:
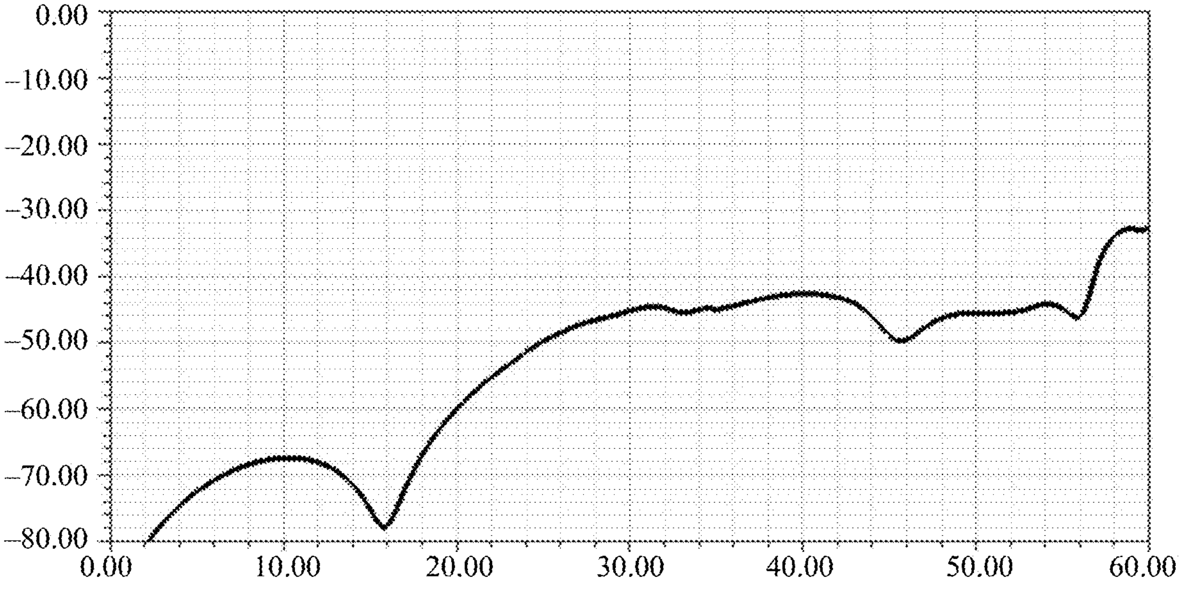
FIG. 14 is a diagram of signal data simulation of another connector according to an embodiment of this application.

FIG. 14 shows a diagram of signal data simulation of the connector 10 obtained when a plurality of ground terminals are grounded by using a ground network (e.g., an electrical connection between the plurality of ground terminals).

In FIG. 13 and FIG. 14, a horizontal coordinate is a resonance frequency with a unit GHz; and a vertical coordinate is crosstalk.

In FIG. 13, when a resonance frequency of the connector 10 is near 28 GHz, signal crosstalk is about −41 dB (decibels). In FIG. 14, when a resonance frequency of the connector 10 is near 28 GHz, signal crosstalk is about −47 dB. It can be learned by comparing FIG. 13 and FIG. 14 that, after the ground terminals are grounded by using the ground network, the resonance frequency of the connector 10 may be significantly increased, and signal crosstalk can be effectively reduced. Therefore, after the ground terminals are connected by using the ground network, the resonance frequency of the connector 10 can be effectively increased, and the signal crosstalk can be effectively reduced.

Therefore, in an embodiment provided in this application, a conductive circuit 113 may be disposed on the substrate 11 to implement an electrical connection between the ground terminals.

Figure 15:
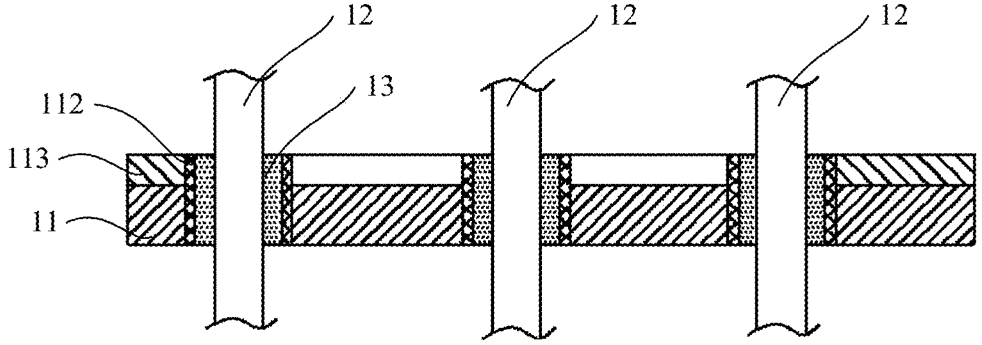
FIG. 15 is a schematic diagram of a local cross-sectional structure of a connector according to an embodiment of this application.

In some embodiments, as shown in FIG. 15, a conductive layer 112 may be disposed on an inner wall of the through hole (which is not marked in the figure). The conductive circuit 113 may be disposed on the upper plate surface of the substrate 11, and the conductive circuit 113 is electrically connected to the conductive layer 112 that is in the through hole. The conductive circuit 113 may be directly formed on the upper plate surface of the substrate 11 in a manner such as coating, etching, or bonding. Alternatively, the conductive circuit 113 may be formed by using an additional conductor, to connect the conductive layer 112 that needs to be electrically connected. The ground terminals may be electrically connected to the conductive layer 112 that is on the inner wall of the through hole by using the fastening medium 13, to implement electrical connections between a plurality of ground terminals and the conductive circuit 113. In other words, the plurality of ground terminals may be grounded by using the conductive circuit 113, so that grounding consistency between the plurality of ground terminals can be improved, to improve signal transmission performance of the connector 10. The fastening medium 13 may be a conductive material such as tin or silver, to facilitate implementing good electrical connections between the ground terminals and the conductive layer 112.

In some embodiments, the conductive circuit 113 may be disposed on the lower plate surface of the substrate 11, or disposed on both the upper plate surface and the lower plate surface of the substrate 11.

Alternatively, the substrate 11 may be of a multilayer-plate structure, and the conductive circuit 113 may be disposed between adjacent sub-substrates 11.

Figure 16:
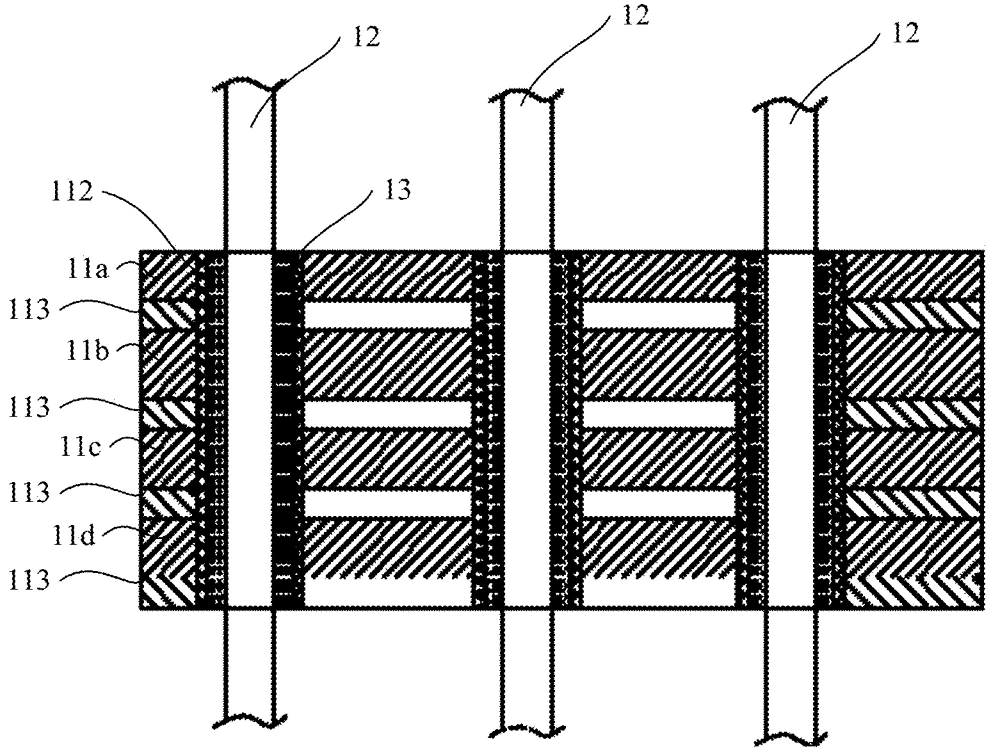
FIG. 16 is a schematic diagram of a local cross-sectional structure of another connector according to an embodiment of this application.

For example, as shown in FIG. 16, in an embodiment provided in this application, the substrate 11 includes four sub-substrates that are disposed in a stacked manner: a sub-substrate 11*a*, a sub-substrate 11*b*, a sub-substrate 11*c*, and a sub-substrate 11*d*. Conductive circuits 113 are disposed on a lower plate surface of the sub-substrate 11*d* and between every two adjacent sub-substrates.

It may be understood that, in some embodiments, the conductive circuits 113 may alternatively be disposed only between two adjacent sub-substrates. Alternatively, the conductive circuit 113 may alternatively be disposed between every two adjacent sub-substrates. A disposing location and a structure of the conductive circuit 113 are not limited in this application.

In addition, to improve signal transmission performance of the signal terminal and avoid a bad condition such as crosstalk, during disposing, signal terminals may be isolated from each other by using the ground terminals as much as possible.

Figure 17:
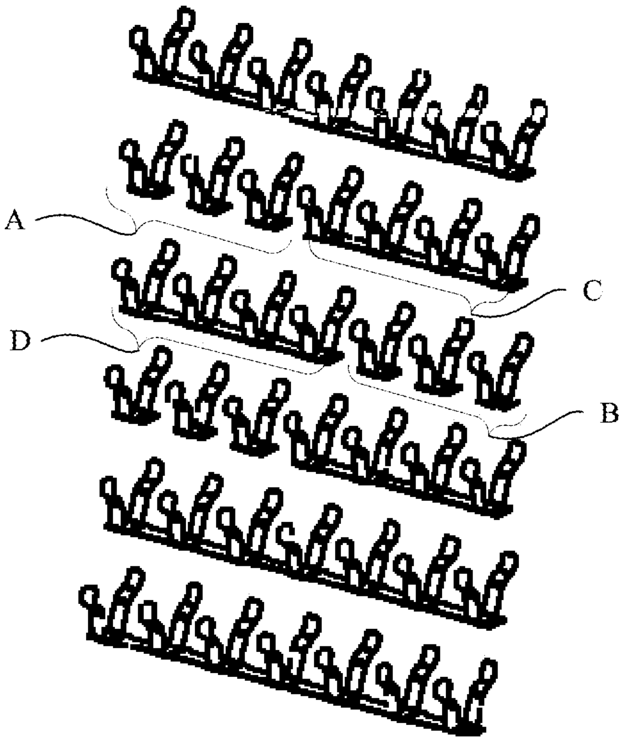
FIG. 17 is a schematic diagram of a structure of a conductive terminal of a connector according to an embodiment of this application.

For example, as shown in FIG. 17, in this embodiment provided in this application, a plurality of conductive terminals 12 are arranged in a matrix manner. A signal terminal group A in a second row and a signal terminal group B in a third row are effectively isolated by using a ground terminal group C and a ground terminal group D, to avoid signal crosstalk generated between the signal terminal group A and the signal terminal group B.

It may be understood that, in some embodiments, a disposing quantity and a location arrangement of signal terminals and ground terminals may be flexibly disposed according to an actual situation, which is not limited in this application.

Figure 18:
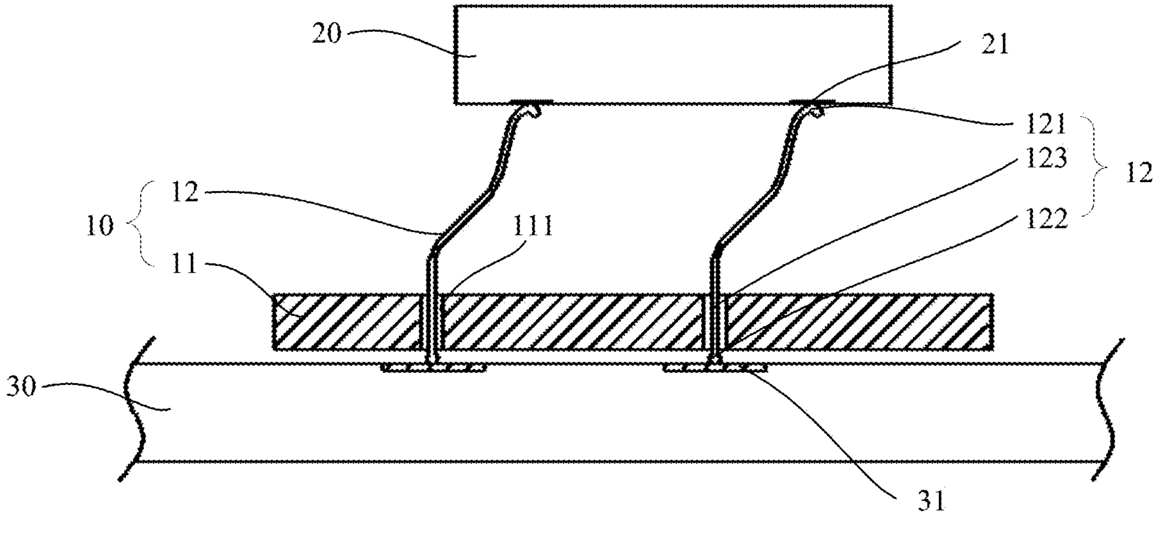
FIG. 18 is a schematic diagram of a cross-sectional structure of another electronic device according to an embodiment of this application.

In addition, as shown in FIG. 18, an embodiment of this application further provides an electronic device which includes a first electrical element 20, a second electrical element 30, and a connector 10. The first electrical element 20 includes a pad 21 on the bottom, and the second electrical element 30 includes a pad 31 on the top. The pad 21 abuts against the first conductive part 121 of the conductive terminal 12, to implement an electrical connection between the pad 21 and the conductive terminal 12. The pad 31 abuts against the second conductive part 122 of the conductive terminal 12, to implement an electrical connection between the pad 31 and the conductive terminal 12. In other words, the conductive terminal 12 can implement an electrical connection between the pad 21 and the pad 31. In an embodiment, there may be a plurality of pads 21, pads 31, and conductive terminals 12 that are disposed. A disposing quantity of the pads 21, the pads 31, and the conductive terminals 12 is not limited in this application.

In addition, in an embodiment, the first electrical element 20 may be an electrical element such as a chip, and the second electrical element 30 may be an electrical element such as a main board. Types of the first electrical element 20 and the second electrical element 30 are not limited in this application.

In addition, the electronic device may be a type such as a mobile phone, a tablet computer, a desktop computer, or a television. In other words, the connector 10 may be applied to a plurality of different types of electronic devices, to implement an electrical connection between electrical elements that need to be connected.

The foregoing descriptions are merely embodiments of this application, but are not intended to limit a protection scope of this application. Any variation or replacement readily figured out by a person skilled in the art within the technical scope disclosed in this application should fall within the protection scope of this application. Therefore, the protection scope of this application shall be subject to the protection scope of the claims.

What is claimed is:

1. A connector, comprising:

a substrate, comprising M through holes; and

M conductive terminals, wherein the M conductive terminals are disposed to penetrate through the M through holes in a one-to-one correspondence, and wherein each conductive terminal in the M conductive terminals comprises:

a first conductive part;

a second conductive part; and a holding part, wherein the first conductive part is located at a first end of the conductive terminal;

the second conductive part is located at a second end of the conductive terminal;

the holding part is located between the first conductive part and the second conductive part;

the holding part is fastened in the through hole by using a fastening medium that is a conductive material;

an inner wall of the M through holes comprises a conductive layer;

the substrate comprises a conductive circuit that is electrically connected to the conductive layer of the inner wall of at least one of the M through holes;

M is an integer greater than or equal to 1;

the substrate comprises a plurality of stacked sub-substrates; and the conductive circuit is located between two adjacent sub-substrates in the plurality of stacked sub-substrates.

2. The connector according to claim 1, wherein the first conductive part is of an elastic arm structure or a solder ball structure.

3. The connector according to claim 1, wherein the second conductive part is of an elastic arm structure or a solder ball structure.

4. The connector according to claim 1, wherein the conductive terminal comprises a first segment and a second segment that are separated from each other; and the first conductive part and a part of the holding part are located in the first segment, and the second conductive part and another part of the holding part are located in the second segment.

5. The connector according to claim 1, wherein the connector further comprises a support base; and the support base is fastened to at least one of the M conductive terminals and abuts against one of plate surfaces of the substrate.

6. The connector according to claim 5, wherein the support base comprises a protrusion part that extends in a direction away from the substrate.

7. The connector according to claim 1, wherein the conductive circuit is located on a plate surface of the substrate.

8. An electronic device, comprising:

a first electrical element:

a second electrical element; and a connector, comprising:

a substrate, comprising M through holes; and

M conductive terminals, wherein the M conductive terminals are disposed to penetrate through the M through holes in a one-to-one correspondence, and wherein each conductive terminal in the M conductive terminal comprises:

a first conductive part;

a second conductive part; and a holding part, wherein the first conductive part is located at a first end of the conductive terminal;

the second conductive part is located at a second end of the conductive terminal;

the holding part is located between the first conductive part and the second conductive part;

the holding part is fastened in the through hole by using a fastening medium that is a conductive material;

an inner wall of the M through holes comprises a conductive layer;

the substrate comprises a conductive circuit that is electrically connected to the conductive layer of the inner wall of at least one of the M through holes;

M is an integer greater than or equal to 1;

the substrate comprises a plurality of stacked sub-substrates; and the conductive circuit is located between two adjacent sub-substrates in the plurality of stacked sub-substrate.

9. The electronic device according to claim 8, wherein the first conductive part of the connector is of an elastic arm structure or a solder ball structure.

10. The electronic device according to claim 8, wherein the second conductive part of the connector is of an elastic arm structure or a solder ball structure.

11. The electronic device according to claim 8, wherein the conductive terminal of the connector comprises a first segment and a second segment that are separated from each other; and the first conductive part and a part of the holding part are located in the first segment, and the second conductive part and another part of the holding part are located in the second segment.

12. The electronic device according to claim 8, wherein the connector further comprises a support base; and the support base is fastened to at least one of the M conductive terminals and abuts against one of plate surfaces of the substrate.

13. The electronic device according to claim 12, wherein the support base comprises a protrusion part that extends in a direction away from the substrate.

14. The electronic device according to claim 8, wherein the conductive circuit is located on a plate surface of the substrate.

* * * * *